June 21, 1927.

R. W. DAVIS 1,633,167

POWER INSTALLATION

Filed April 17, 1922

Inventor
R. W. Davis by
Attorney

Patented June 21, 1927.

1,633,167

UNITED STATES PATENT OFFICE.

RAE W. DAVIS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

POWER INSTALLATION.

Application filed April 17, 1922. Serial No. 553,447.

This invention relates in general to power installations, and it has particular relation to hydro-electric power installations where the hydraulic machine is operative under or against a widely varying head.

When a turbine is direct-connected to an alternating current generator, it is desirable that the turbine should always operate at the same speed, so that the generator current may be always of the same frequency, for, otherwise, parallel operation with other generators would be impossible. If a constant load on the turbine be assumed, the speed thereof would tend to vary in the same sense as the supply of energy available at the inlet of the turbine.

In the case of the hydraulic turbine, this speed variation would be as the square root of the net head on the turbine. However, a hydraulic turbine operating at a speed approximately 100 per cent higher than normal may show such unfavorable hydraulic efficiencies as to render such operation an uncommercial proposition; and the range of economic operating speeds is accordingly limited to some extent. The power developed by such a turbine is even more sensitively affected by a change in the net head: first, on account of the head itself, and second, on account of the discharge capacity. The capacity or power of the turbine is also subjected to variation due to variation in the efficiency of the turbine, for the efficiency varies from its most favorable value as the speed is greater or less than normal.

The present invention may include the use of an alternating current generator mechanically coupled to a hydraulic turbine which is subjected to widely varying heads, along with means for insuring that the generator produces and supplies current at a definite, desired frequency, to the final end that, independently of the head under which the turbine operates, the frequency of the current supplied to the line circuit may remain constant at the desired value; and it includes the automatic control of such a hydro-electric installation so that, independently of changes in the head and speed of the turbine, the generator may continue to produce current of the desired, definite frequency. An installation of this character is of great utility, especially where there is great fluctuation in the available head, as might occur where the head available on the turbine is directly or indirectly due to the effect of tides.

It is an object of this invention to provide a power installation of improved design wherein an alternating current dynamo-electric unit is operable at different normal speeds, and is connected in power relation to a distribution circuit of definite frequency.

It is a further object of this invention to provide an improved form of hydro-electric installation comprising an alternating current generator unit driven by a hydraulic turbine normally subjected to a widely variable head, along with means for insuring that the generator unit produces and may supply current of the desired frequency to the distribution circuit.

It is a further object of this invention to provide a hydro-electric installation of improved design comprising an alternating current generator operable by a hydraulic turbine which is capable of operation under widely varying head, and a variable frequency device including a rotary converter for supplying to the generator a current of variable frequency, so as to insure that the generator may supply energy of constant frequency to the line circuit.

It is a further object of this invention to provide a hydro-electric installation of improved design comprising an alternating current generator operable by a hydraulic turbine which is operative under widely varying head, and a variable frequency device for insuring the supply of current of variable frequency to the generator, along with devices automatically operative to control, among other things, the variable frequency device, to the end that the energy supplied by the generator may be of constant frequency, independently of variations in the head or the speed of turbine.

These and other objects and advantages are secured by the present invention, various novel features of which will appear from the description and drawings herein, disclosing an embodiment of the invention, and will be more particularly pointed out in the claims.

Figure 1:
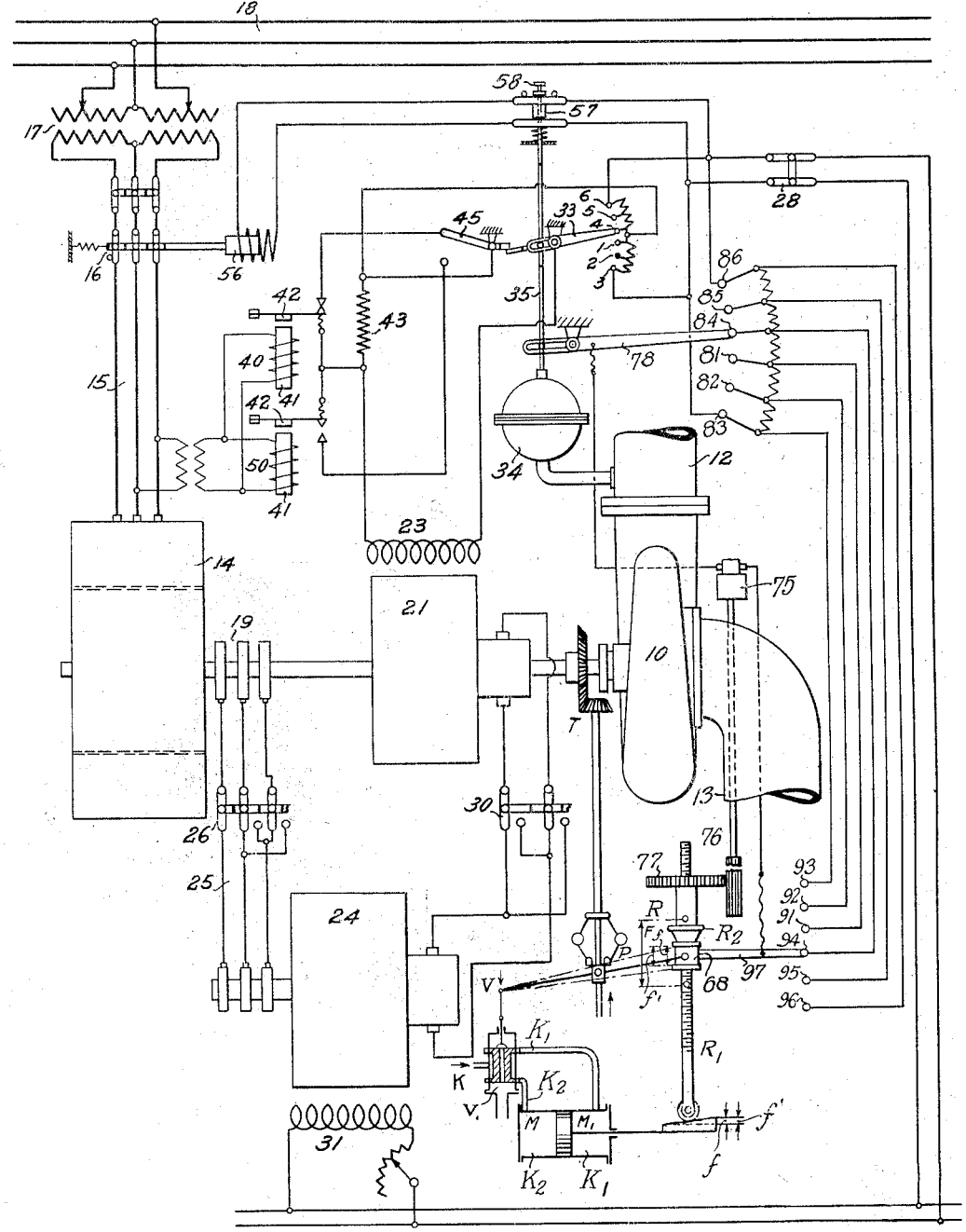
Fig. 1 represents a hydro-electric installation, in generally diagrammatic form, embodying features of the present invention.

In accordance with the disclosure of Fig. 1 of the drawings, a hydraulic turbine 10 is suitably mounted in a setting; and the inlet 12 of the turbine may be provided with regulating means of any recognized form, such as adjustable guide vanes on the turbine casing. The turbine discharge 13 preferably includes some recognized form of draft tube discharging into a tail-race. An alternating current generator 14 is directly connected to the turbine shaft. This generator is indicated as being of the induction type, that is, generally similar to a wound rotor induction motor, the stator of the machine constituting the armature and having its circuit 15 connected, preferably through a switch 16 and, if desired, through a variable ratio transformer 17, to the line circuit 18. As indicated, the rotor element of the generator has its 3-phase windings connected to slip-rings 19 so as to provide for the supply thereto of alternating current of variable frequency, and even, in some cases, direct current.

In order to produce current of a definite frequency in the armature circuit of the generator 14, with direct current or alternating current of constant frequency supplied to the slip rings 19, it is necessary that the rotor be driven at a constant or definite speed. Hence, on variation of this speed from normal for any reason, the frequency of the current supplied by the generator will vary accordingly, unless means are provided for causing such corresponding variation in the frequency of the current supplied to the slip-rings 19 as will compensate for the change in speed.

Assuming as a definite normal or synchronous speed of the generator 14 that value which, with the rotating field excited by direct current, that is, a current whose frequency is zero and, hence, produces no electrical rotation of the magnetic field, causes the generator to produce current of line frequency, one can consider that this speed is produced by a head $H_a$ on the turbine. This head $H_a$ is equal to the average value of the entire range of head to which the turbine is subjected. Under these conditions of direct current excitation, the rotation of the magnetic field of the generator is due wholly to the rotation of the rotor. If now the speed of the generator should vary below or above this normal or synchronous value, the speed of rotation of the magnetic field of the generator and hence, the frequency of the current induced in the armature would vary correspondingly. However, this constant frequency of the current produced by the generator may be maintained at the normal or synchronous value, in spite of this variation in speed, by adding to or subtracting from that increment of the speed of rotation of the magnetic field due to the mechanical rotation of the rotor, a component of field rotation due to the energizing current itself. Hence, by supplying to the slip-rings of the generator, alternating current of the required direction and frequency, the resultant speed of rotation of the magnetic field and the frequency of the armature current may be maintained at the desired constant synchronous value, independently of variations in the speed of the turbine and generator.

In accordance with the embodiment of this invention disclosed, the rotating element of the generator 14 is supplied through its slip rings 19, with current of a frequency dependent upon the speed at which the generator is driven by the turbine 10. The variable frequency source includes, as shown herein, a direct current machine 21 whose armature is monuted on the turbine shaft, the stationary field being indicated at 23. The armature of this machine is connected to the direct current side of a rotary converter 24, the 3-phase alternating current slip-rings of the rotary converter being connected, preferably through a switch 26 which may be of the reversing type to permit reversal of one phase, to the slip-rings 19 of the generator 14.

The field 23 of the direct current machine 21 is connected, preferably through a switch 28, to a source of direct current 29. The circuit of the field 23 of the direct current machine is provided with a variable and reversible rheostat 32 which insures that the voltage of the machine 21 may be reversed and varied in magnitude in a plurality of steps. The exciting field 31 of the rotary converter is connected through a variable rheostat, which may be reversible if desired, to the direct current source 29.

The connection between the machine 21 and the rotary converter 24 may be through a reversing switch 30 which will permit reversal of the direction of rotation of the converter.

In operation, with the connections between the machines as indicated, the speed and direction of operation of the rotary converter 24 is dependent upon the direction and voltage of the direct current supplied to the converter by the machine 21; and there is a fixed relation between the voltage and frequency of the alternating current at the slip-rings of the rotary converter and the voltage of the direct current supplied by the machine 21 to the commutator of the rotary converter. Hence, in order to produce an alternating current of any required frequency or direction at the slip-rings of the rotary converter and, hence, in the rotating element of the generator 14, it is necessary to produce direct current of the required direction and voltage at the commutator of the machine 21.

It will be apparent that the two elements controlling the voltage of the direct current machine 21 are its speed and its field excitation. The rheostat 32 is so designed that it has definite operative positions for the rheostat arm 33 which correspond to the operating speeds maintained for the turbine; and the resultant voltage at the terminals of the machine 21, due to the particular speed of the operation and the corresponding field excitation of the machine, is such as to cause the rotary converter 24 to produce and supply to the slip-rings 19, alternating current of the required frequency and direction to insure the production of alternating current of the required definite and constant frequency in the armature of the generator 14.

As stated above, in order to maintain a definite or constant frequency of the alternating current produced by the generator 14 during operation of the turbo-generator set at different speeds, it is necessary that the magnetic field of the generator rotate in space at a constant speed. This resultant speed of rotation may be the sum of the component due to mechanical rotation and that due to electrical rotation, when alternating current is supplied to the slip-rings 19, as is the case when the generator is operating a speed below synchronous speed. Again, this resultant speed of rotation of the magnetic field of the generator may be the difference between the component due to mechanical rotation and that due to electrical rotation, as when the generator is operating at a speed above synchronous speed.

The arm 33 of the rheostat 32 may have any desired number of operating positions on either side of an intermediate position corresponding to zero current through the field winding 23. Each of these operating positions may correspond to a definite and desired operating speed at which the turbine may be maintained by its speed governor. As indicated herein, the rheostat has three positions on each side of neutral, corresponding to six operating speeds of the turbine. As will be apparent, the number and value of the operating speeds will be dependent to a great extent on the range of head variation to which the turbine is subjected.

Under conditions of normal design and operation of hydraulic turbines, fairly efficient operation of a turbine may be maintained under conditions of constant speed and variable load, even though there is considerable variation in the head under which the turbine operates.

The hydro-electric installation disclosed herein may be considered as being subjected to a variable head divided into six ranges within each of which the turbine may be maintained at a definite operating speed through the action of its speed governor. These ranges may be considered as $H_1$ for the first range whose lower limit is the average head $H_a$, which corresponds to synchronous speed of the turbo-generator set, as described above, $H_2$ for the next higher range, and $H_3$ for an additional higher range; and $H_4$ for the range whose upper limit is the average head $H_a$, $H_5$ for the next lower range, and $H_6$ for an additional lower range.

It may be considered that the turbine, when subjected to the average head, has a normal operating speed of 300 R. P. M., and hence the generator 14, with direct current excitation and assuming the generator to be wound for 24 poles, would produce alterating current of 60 cycles and at 4,000 volts.

However, for the reason that direct current excitation of the rotating element of the induction generator 14 can hardly be secured in a most satisfactory manner through the 3-phase winding primarily designed for alternating current, it may not be desirable that the above described synchronous speed of the set be selected as one of the normal operating speeds.

Assume that the turbine is operating under a head whose average value is $H_4$, that is, within the first range below $H_a$. Under these conditions of operation, the speed governor is adjusted to maintain a turbine speed of 275 R. P. M., the arm 33 of the field rheostat being in position No. 4, above intermediate position, as indicated. Under these circumstances of speed and field energization, the direct current machine 21 produces and supplies to the rotary converter direct current of such voltage as to cause the converter to produce alternating current of a frequency of 5 cycles, this current being supplied to the slip-rings of the induction generator and causing an increase in the speed of rotation of the magnetic field thereof, thus causing it to rotate in space at a speed corresponding to the sum of 55 cycles, due to the mechanical rotation of the field, and 5 cycles, due to the electrical rotation of the field, or a resultant of 60 cycles. Accordingly, this rotating magnetic field produces current in the armature of a frequency of 60 cycles and at the required voltage of 4,000 volts. Any tendency to change in speed is taken care of by the speed governor which maintains this definite speed of 275 R. P. M., through adjustment of the turbine gates.

Assume that the head has decreased further and is now within the range whose average is $H_5$. Under these circumstances, we have an operating speed of 225 R. P. M., and with the arm of the rheostat 32 in position No. 5, the machine 21 produces and supplies to the rotary converter direct current of such voltage as causes the converter to produce and supply to the rotating element of the generator 14 alternating current of a frequency of 15 cycles. This has effect of increasing the speed of rotation of the rotating magnetic field of the generator from 45 cycles to 60 cycles. As before, there is produced in the armature of the generator 14 current of 60 cycles and at the required voltage.

Likewise, with the rheostat arm 33 in position No. 6, and a turbine speed of 175 R. P. M., the rotary converter supplies alternating current of 25 cycles to the rotating element of the induction generator, thus increasing the speed of rotation of the rotating magnetic field thereof to 60 cycles, so as to cause the generator to supply current of 60 cycles and at the required voltage.

Assume now that the head has increased above the average value $H_a$ to a value within the range $H_1$, that is, the first range above the average value $H_a$. Under these circumstances, the arm 33 of the rheostat is shifted to position No. 1, the first position below its intermediate position. With the rheostat in this position, the direction of current flow through the field 23 and, hence, the polarity of the machine 21 is reversed, and with the field of the rotary converter 24 and the switches 30 and 26 unchanged, the converter supplies alternating current which causes a rotation of the magnetic field of generator 14 in a direction opposite to that due to the mechanical rotation of the field. Position No. 1 of the rheostat arm 33 corresponds to a turbine speed of 325 R. P. M. Hence, the resultant speed of rotation of the magnetic field of the generator is the difference between 65 cycles, due to mechanical rotation of the field, and 5 cycles, due to the current of 5 cycles supplied by the rotary converter, or a resultant of 60 cycles. This energy is still at the required voltage of 4000 volts.

Likewise, with the arm 33 of the rheostat in position No. 2, corresponding to operation of the turbine within the range of head $H_2$ and at a speed of 375 R. P. M., the rotary converter produces alternating current of 15 cycles, and this results in a decrease in the speed of rotation of the rotating magnetic field of the generator from 75 cycles due to mechanical rotation, to 60 cycles, the result being that 60 cycle current is still supplied by the generator at the required voltage.

Again, with the arm of the rheostat in position No. 3 and a turbine speed of 425 R. P. M., corresponding to operation of the turbine within the range of the head $H_6$, the rotary converter supplies alternating current of 25 cycles to the rotating element of the induction generator, causing a decrease in the speed of the magnetic field therein from 85 cycles to 60 cycles, the final result being that the generator still supplies 60 cycle current at the required voltage.

It will be apparent that instead of the rotary converter 24, a synchronous motor-generator set may be utilized, the direct current machine of the set acting as a motor supplied with direct current energy from the machine 21, to drive the set at a speed proportional to the voltage of the machine 21, and 3-phase alternating current of the required frequency and voltage being supplied by the synchronous generator of the set to the slip rings 19 of the generator 14.

In the specific embodiment of the invention illustrated, the arm 33 of the rheostat 32 is actuated through a rod 35, this rod being actuated by a device responsive to the head or other characteristics of the energy available at the inlet of the turbine. As indicated herein, this head-responsive device is in the form of a pressure device 34 wherein fluid pressure due to the head on the turbine, acts on a flexible diaphragm of the device, this diaphragm being connected to the operating rod 35 to impart the desired motion to the rheostat arm, to the end that this arm is actuated to include in the circuit of the field 23 the required amount of resistance to cause the machine 21 to produce energy of the required voltage.

It is preferable that the rheostat arm 33 be so arranged that it has a snap action from one operative position to another, as the head on the turbine changes from one operating range to another. With such an arrangement, it may be insured that the field excitation of the machine 21 is varied simultaneously with each change in the adjustment of the speed governor.

Either the head responsive device 34 or an additional head responsive device may be utilized for controlling the adjustment of the speed governor for the turbine, that is, to change its setting so as to cause it to maintain the operating speed corresponding to the particular range of head. The particular arrangement disclosed herein includes a governor of the long range type shown in the copending application of Arnold Pfau, Ser. No. 498,720, filed September 6, 1921.

The drawing shows schematically a servomotor M of well known construction, such as is used for controlling the guide-vane openings of turbines. The regulating valve V receives fluid pressure, as indicated at K, and admits same, according to the position of the regulating valve piston $V_1$, either to a passage $K_1$ communicating with the front side of the regulating piston $M_1$ of the servo-motor M, or to a passage $K_2$ communicating with the rear side of the regulating piston $M_1$. The desired actuation of the turbine guide vanes or other controlling means for the turbine 10 is transmitted from the regulating piston $M_1$ of the servo-motor M in any suitable well known manner. The motion of the regulating piston $M_1$ is also transmitted to relay R. A speed governor P receives its revolutions through a drive T from the turbine shaft and transmits the motion of the shifting collar or stud of the governor to the floating lever V—P—R. As soon as the regulating valve piston $V_1$ is raised out of its mid position, fluid pressure K reaches the front side $K_1$ of the regulating piston $M_1$, moving the latter until the regulating valve piston $V_1$ is brought back to its former mid position. This is attained by the relay R and the floating lever V—P—R in such a way that the forward motion of the regulating piston $M_1$ produces an upward motion of the end R of the floating lever, this end of the lever including a collar or hand wheel $R_2$ adjustably mounted on relay rod $R_1$, causing the regulating valve piston $V_1$ to be lowered after it had first been raised by the speed governor.

For each position of the nut or collar $R_2$, there corresponds a certain number of revolutions of the speed governor, if the design of the latter is static, the hand wheel $R_2$ being adjustable along the relay rod $R_1$ in upward or downward direction, to definitely fix the normal regulated speed of the turbine. With this arrangement, therefore, one can obtain the result that any operating speed can be controlled with the same drive of speed governor and with the same speed governor.

The springs of the governor P are of such strength as to produce the desired governing effect through a wide active range, to thereby obtain a regulating effect that produces a plurality of constant speeds of the turbine, these speeds corresponding to different settings of the adjusting wheel $R_2$ on the rod $R_1$. This desired regulation is such that the full stroke of the regulating or compensating mechanism, such as the valve $V_1$ of the servo-motor, corresponding to the full stroke $f, f'$ in either direction from such normal speeds, corresponds to only partial stroke of the governor fly ball device, the effect being such as to produce constant speed independently of a variation in the load of the turbine between substantially no load and the desired limit of overload; and further, this desired regulation to produce constant speed at variable load is obtainable for any one of widely variant operating speeds, such as might correspond to operation of the turbine under conditions of variable head.

The desired operation of the end R of the lever V—P—R, to automatically vary the controlled speed of the turbine as the head thereon varies, may be secured by means of an electric motor 75, preferably connected through a worm 76 and a pinion 77 so as to produce shifting of the collar or nut $R_2$ with which the hand wheel is associated, up and down on the rod $R_1$, in the same manner as may be attained by hand.

Associated with the rod 35 of the head responsive device 34 is a pivoted lever 78, the contact end of this lever 78 moving over contacts 81, 82, 83, 84, 85 and 86 of a sectional rheostat. The operating arrangement of the pivoted arm 78 is such that the contact end of the arm moves from one to another of the contacts as the arm 35 moves over the contacts 1, 2, 3, 4, 5 and 6 of the sectional rheostat controlled by the pivoted arm 33, it being contemplated that the contact end of the arm 33 engages contacts 1, 2, 3, 4, 5 and 6 at substantially the same time as the contact end of the arm 78 engages contacts 81, 82, 83, 84, 85 and 86, respectively. The sectional rheostat with which the latter contacts are associated is preferably of the potentiometer or balanced type capable of causing a current to flow in either direction, as desired, in a derived controlled circuit, which in the present case, is the circuit of the motor 75. The contacts 81 to 86, inclusive, are connected to contacts 91 to 96, inclusive, respectively, as indicated, this latter group of contacts being disposed in position to be engaged by the contact end of an arm 97 mounted upon or actuated by the nut or collar associated with the hand wheel $R_2$. The preferable arrangement of the contact portion of the operating arms 78 and 97 is such as insures operation of the contact end from one contact to another with a sudden or snap action.

Under any normal condition of operation of the hydro-electric unit, that is, with the turbine operating at a particular one of its control speeds, the contact end of the arm 97 is in contact with that one of the group of contacts 91 to 96, inclusive, which is connected to the particular contact of the sectional rheostat which is engaged by the contact end of the pivoted arm 78. And under these normal conditions, it will be apparent that the motor 75 is at rest, there being no potential applied, in either direction, across the terminals of the same. As indicated in the drawings, one terminal of the motor 75 is connected, through the contact end of the arm 78, to that point of the sectional rheostat to which contact 84 is connected, and the other terminal of the motor is connected, through the contact end of the arm 97 and contact 94, to the same contact 84 of the sectional rheostat. Assume that the head to which the turbine is subjected increases to such an extent as causes the operating arm 33 to be moved to contact 1 and the operating arm 78 to be moved to contact 81, then a potential is applied across the terminals of the motor 75 in such direction as to cause operation thereof and actuation of the adjustable collar on the relay R in an upward direction, the collar being shifted until it reaches such position as causes actuation of the contact end of an arm 97 into engagement with contact 91. At this time, through the corresponding adjustment of its section of the rheostat, the two terminals of the motor are short-circuited, the motor being accordingly brought to a stop. From this description of the automatic operation of the means for varying the speed setting of the governor, it will be apparent that, as the head on the turbine increases or decreases to any one of the predetermined values corresponding to a change in speed of the turbine, the adjustable collar of the relay R is actuated by the motor 75 in the appropriate direction to a position inherently associated with the proper controlled speed of operation of the turbine.

While the setting of the rheostat 32 may be sufficient under ordinary conditions to produce the required degree of constancy of the frequency and voltage of the current of the generator 14, nevertheless, it may be desirable to have present in the system an auxiliary device responsive to initial changes or tendency toward changes in the voltage or frequency of the current produced by the generator 14, and effective to maintain these characteristics at the desired constant value, say 4000 volts and 60 cycles. As indicated herein, a voltage regulator 40 comprises a magnet 41 responsive to the voltage of the armature circuit of the generator 14, and an armature 42, indicated as being of the vibrating reed or spring type, arranged so that, when drawn to attracted position, it removes a normal short-circuit about the resistance 43 in the circuit of the field winding 23 of the machine 21. As indicated, the short-circuit about the resistance 43 is closed through a switch 45 in its upper operative position. As will be apparent, the operation of the armature 41 is extremely rapid, making and breaking the short-circuit about the resistance 43 at such a rate as to maintain the required average excitation of the field of the machine 21, to maintain at the terminals of such machine the voltage required to insure that the generator 14 produces current of 60 cycles and 4000 volts.

The system disclosed herein, including automatic devices for varying the resistance of the field of the direct current machine 21, comprising the voltage regulating device 40, and the head-responsive device for adjusting the speed governor setting, will be wholly automatic in its operation throughout the entire range of head variation. In other words, the generator may remain permanently connected to the line 18, and even though there are considerable changes in speed of the turbine and generator, as the head changes from one operating range to another and the governor is adjusted for the new speed, the automatic regulator 40 is effective to compensate for this variation in speed and maintain the required voltage at the terminals of the generator 21 so as to insure that current of the required voltage and frequency is applied to the slip rings 19 and thus the generator 14 continues to produce electrical energy of the required constant frequency and voltage.

In order to maintain the required voltage and frequency of the current supplied to the slip rings 19 when the set is operating at a speed above synchronous speed, it will be necessary that an automatic regulator 50 be provided, which inserts resistance in, rather than removes resistance from, the circuit of the field 23 in order to check increases in the frequency and voltage of the generator 14. This regulator 50 is a duplicate of the regulator 40, except that the armature of regulator 50, when drawn up to attracted position, completes a short circuit about the resistance 43, the effect of which will be apparent when it is considered that, for operation at super-synchronous speeds, an increase in the voltage of the machine 21 causes a decrease in the voltage or frequency of the current produced by the generator 14. It will be noted that this short-circuit about the resistance 43 is completed through the two-way switch 45 when the latter is in its lower operative position.

In order that only the desired one of the regulators be in operation, it is desirable that the two-way switch 45 be automatically operative to selectively permit control of the resistance 43 by the desired regulator 40 or 50. As indicated, this automatic operation of the switch 45 is effected by cooperation of a portion of the rheostat arm 33 with a tail portion on the switch so that the switch is actuated to one or the other position as the rheostat arm passes through intermediate or neutral position, corresponding to passage of the speed of the set through synchronous speed. Further, this operation of the switch 45 may be secured through the adjustable nut or collar on the relay rod of the speed governor as the nut passes through the position corresponding to the normal or synchronous speed of the set due to the average head $H^a$. Likewise, this two-way selective switch may be actuated by a polarized relay responsive to the direction of current flow in the circuit between the machine 21 and the rotary converter 24, or in the circuit of the field 23 of the machine 21.

In order to disconnect the generator 14 from the line when the head on the turbine drops to such a low value as to render operation of the set inadvisable, the switch 15 is of a type which may be spring urged to open position and drawn into and held in closed position by an electromagnet 56. The energizing circuit for this magnet 56 is normally closed by a switch 57 which is automatically opened by a projection 58 on an extension of the rod 35, when the head drops to an abnormally low value. A second projection may be provided on the rod 35' to cause opening of the switch 57, when the head rises to a destructively or otherwise undesirable high value.

The regulator 40 may be of any commercial form, although it would probably be most desirable that this regulator be of the type of the well known Tirrill regulator. The switch 45 may be arranged to break the energizing circuit of the regulator not in use at any particular time.

If desired, an additional operating speed, corresponding to actual synchronous speed of the generator 14, may be utilized. To produce this operating speed, direct current may be supplied from the circuit 29, through slip rings 19 to one phase of the rotor winding of the generator. The making and breaking of this direct current circuit may be automatic in response to the position of the adjusting nut of the governor corresponding to synchronous speed.

The system described hereinabove is an inherently constant k. w., variable torque system, and accordingly, is automatically regulated through the means for controlling the amount of hydraulic energy supplied to the turbine inlet. As a modification, the invention may be utilized in connection with a constant torque, variable k. w. system, by substituting for the direct current machine 21 a direct current machine driven from a separate source, which is preferably a synchronous motor direct-connected to the direct current machine and supplied from the line 18. The field of this direct current machine is controlled as to direction and intensity by the same type of rheostat as is indicated at 32 the function of which is to produce direct current of the required voltage and direction dependent upon the head on the turbine, to the end that alternating current of the required direction and frequency may be supplied by the rotary converter 24 to the slip rings of the generator 14.

Figure 2:
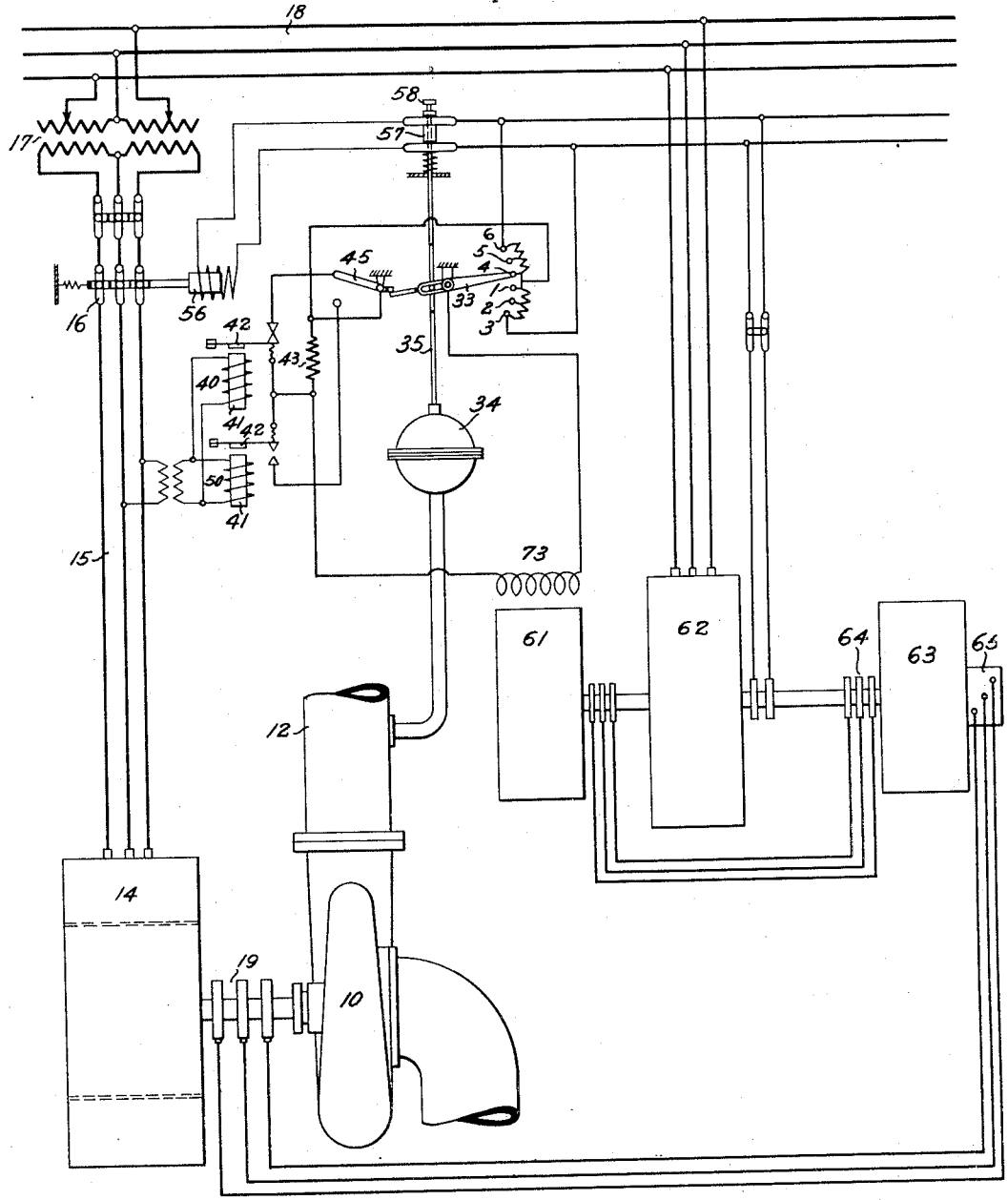
Fig. 2 is a similar showing of a modified embodiment of the invention.

In Fig. 2 there is disclosed a modified system wherein a synchronous generator 61, driven at a constant speed by a synchronous motor 62 which is supplied from the line circuit 18, has its armature connected to supply alternating current of constant frequency at variable voltage to a rotary frequency converter 63. This frequency converter is preferably of the unwound field type and is driven at constant speed by the synchronous motor 62. The generator 61 is connected to slip-rings 64 on the converter 63, and 3-phase alternating current is taken off the commutator 65, through collecting brushes suitably displaced in phase relation, and supplied to the slip-rings 19 of the rotating field of the induction generator 14. Due to the fact that the machines 61 and 63 may be positively operated at a relatively high speed by the synchronous motor 62, all three of these machines may be of minimum size.

The frequency of the alternating current taken off the commutator 65 of the converter 63 bears a definite relation to the voltage of this current which in turn, with constant speed of the generator 61, is dependent upon the degree of excitation of the direct current field 73 of the generator 61. The means for controlling the direction and magnitude of the field excitation of the generator 61 may be the same as the corresponding controlling devices of the system of Fig. 1, as indicated; and also, the automatic devices for connecting and disconnecting the generator 14 to and from the line circuit 18 may be the same as in the system of Fig. 1.

With the set made up of the machines 61, 62, 63 operating at a constant speed, the voltage of the current supplied to the slip rings 64 of the converter 63 is controlled wholly by the field excitation of the generator 61 which is varied and reversed automatically by the action of the head-responsive device 34; and the frequency converter is operative at all times to supply to the rotating field of the generator 14, an alternating current of such direction and frequency as to insure that the generator 14 produces current of constant frequency and voltage for supply to the line circuit 18. The device for automatically adjusting the controlled speed of the turbine 10 may be of the type described in connection with Fig. 1.

While the hydro-electric unit described above finds great utility when connected to a distribution circuit whose frequency is definitely established by one or more generators other than the one of said unit, nevertheless, the present unit may find considerable utility when it is the only power unit connected to or establishing the frequency of the distribution circuit, for through the speed control means described hereinabove, the unit may readily operate to furnish electrical power to said distribution circuit with a desired definite operating frequency.

It should be understood that it is not desired that the invention claimed be limited to the exact details of construction shown and described, for obvious modifications will occur to a person skilled in the art.

It is claimed and desired to secure by Letters Patent:

1. A power installation for operation under conditions of widely varying supply of energy, comprising an alternating current generator unit, a prime mover mechanically connected to said unit and operable to drive said unit at a plurality of different speeds dependent upon the supply of energy available, a distribution circuit, and means operative to insure the supply of electrical energy by said generator unit at a predetermined frequency to said distribution circuit independent of the particular one of said speeds at which said generator is driven, said means comprising a converter of the commutator type adapted to produce variable frequency alternating current.

2. A power installation, comprising an alternating current generator, a variable speed turbine for driving said generator at a plurality of different speeds, a distribution circuit whose frequency is definitely established by means other than said generator, a source of variable frequency electrically connected to said generator, and means for varying the frequency of said source in accordance with the speed of said generator whereby said generator is enabled to produce energy of the definite frequency of said line circuit independently of the particular one of said speeds at which said generator operates.

3. A hydro-electric installation for operation under conditions of widely varying head comprising an alternating current generator, a turbine mechanically connected to said generator and operable to drive said generator at a plurality of different speeds, a distribution circuit, the armature of said generator being connected to said distribution circuit, a frequency converter electrically connected to the field element of said generator, and means for causing variation in the frequency of the current produced by said frequency converter to enable said generator to produce and supply to said distribution circuit current of a predetermined frequency independently of the particular one of said speeds at which said generator is driven.

4. A hydro-electric installation for operation under conditions of widely varying head comprising an alternating current generator, a turbine mechanically connected to said generator and operable to drive said generator at a plurality of predetermined speeds dependent upon the head available, a distribution circuit connected to said generator and whose frequency is definitely established by means other than said generator, and means for insuring the supply of current at said established frequency by said generator to said circuit, said means including instrumentalities for supplying alternating current of variable frequency to said generator, said instrumentalities including a source of variable voltage, and means effective other than through the speed of said turbine for varying the voltage of said source.

5. A hydro-electric installation for operation under conditions of variable head, comprising an alternating current generator, a turbine mechanically connected to said generator and operable to drive said generator at different speeds dependent upon the head available, a distribution circuit carrying current of definitely established frequency connected to said generator, a source of variable voltage, a variable frequency device electrically connected between said source of variable voltage and said generator, and means for varying the voltage of said source and the frequency of the current produced by said variable frequency device whereby said generator is enabled to produce current of constant frequency.

6. A hydro-electric installation for operation under conditions of variable head, comprising an alternating current generator, a turbine mechanically connected to said generator and operable to drive said generator at different speeds dependent upon the head on said turbine, a distribution circuit carrying current of definitely established frequency connected to said generator, a source of variable voltage, a variable frequency device electrically connected between said source of variable voltage and said generator, and means for varying the voltage of said source and reversing the phase of the current supplied by said variable frequency device to said generator.

7. A hydro-electric installation for operation under conditions of variable head, comprising an alternating current generator, a turbine mechanically connected to said generator and operable to drive said generator at different speeds dependent upon the head on said turbine, a distribution circuit carrying current of definitely established frequency connected to said generator, a generator constituting a source of variable voltage, a source of variable frequency electrically connected between said source of variable voltage and said generator, and means for varying the voltage of said variable voltage source and reversing the phase of the current supplied by said source of variable frequency to said generator.

8. A hydro-electric installation for operation under conditions of variable head, comprising an alternating current induction generator, a turbine mechanically connected to said generator and operable to drive said generator at a plurality of different speeds dependent upon the head available, a distribution circuit connectible to said generator, an alternating current generator constituting a source of variable voltage, a source of variable frequency electrically connected between said source of variable voltage and said induction generator, and means for varying and reversing the field excitation of said variable voltage generator to a degree necessary to insure that said induction generator supplies energy of a predetermined frequency to said line circuit independently of the particular one of said speeds at which said induction generator is driven.

9. A hydro-electric installation for operation under conditions of variable head, comprising an alternating current induction generator, a turbine mechanically connected to said generator and operable to drive said generator at a plurality of different speeds dependent upon the head available, a distribution circuit connected to said generator and carrying current whose frequency is definitely established by means other than said generator, an alternating current generator constituting a source of variable voltage, a source of variable frequency electrically connected between said source of variable voltage and said induction generator, a constant speed motor connected in driving relation to said variable voltage generator and said source of variable frequency, and means for varying and reversing the field excitation of said variable voltage generator to a degree necessary to insure that said induction generator supplies energy of line frequency to said line circuit independently of the particular one of said speeds at which said induction generator operates.

10. A hydro-electric installation for operation under conditions of widely varying head comprising a hydraulic machine operable at different normal speeds, an alternating current dynamo-electric machine of the asynchronous type operatively connected to said hydraulic machine for operation therewith at a plurality of predetermined normal speeds, a distribution circuit carrying current of definitely established frequency connectible to said dynamo-electric machine, and instrumentalities automatically controlled in response to a characteristic of the head to which said hydraulic machine is subjected for insuring the transfer between said distribution circuit and said dynamo-electric machine of energy of the definite frequency of said distribution circuit in spite of operation of said dynamo-electric machine at different ones of said normal speeds.

11. A hydro-electric installation, comprising an alternating current generator, a turbine operable to drive said generator at a plurality of different speeds, a distribution circuit adapted to carrying current of definitely established frequency connected to be supplied by said generator, and means automatically operative in response to a condition attendant upon the operation of said turbine for maintaining the frequency of said generator substantially constant independently of the operation of said generator at different ones of said speeds.

12. A hydro-electric installation, comprising an alternating current generator, a turbine operable under variable head to drive said generator at a plurality of fixed speeds, a distribution circuit whose frequency is definitely established by means other than said generator and connectible to be supplied by said generator, and means automatically operative in response to a characteristic of the head under which the turbine operates for maintaining the frequency of said generator substantially constant while said generator is operating at different ones of said speeds.

13. A hydro-electric installation for operation under conditions of variable head, comprising an alternating current generator, a turbine mechanically connected to said generator and operable to drive said generator at different speeds dependent upon the head on said turbine, a distribution circuit carrying current of definitely established frequency connected to said generator, a source of variable voltage, a variable frequency device electrically connected between said source of variable voltage and said generator, and means automatically responsive to a characteristic of the head on said turbine for causing variation in the frequency of the energy produced by said variable frequency device.

14. A hydro-electric installation for operation under conditions of variable head, comprising an alternating current generator, a turbine mechanically connected to said generator and operable to drive said generator at different speeds dependent upon the head on said turbine, a distribution circuit carrying current of definitely established frequency connected to said generator, a source of variable voltage, a source of variable frequency electrically connected between said source of variable voltage and said generator, and means automatically responsive to a characteristic of the head on the said turbine for causing variation in the voltage of said variable voltage source and reversal of the phase of the current produced by said source of variable frequency.

15. A hydro-electric installation for operation under conditions of variable head, comprising an alternating current induction generator, a turbine mechanically connected to said generator and operable to drive said generator at a plurality of definite speeds dependent upon the head on said turbine, a distribution circuit carrying current of definitely established frequency connected to said generator, an alternating current generator constituting a source of variable voltage, a source of variable frequency electrically connected between said source of variable voltage and said induction generator, and means automatically operative in response to changes in the head on said turbine for causing variation and reversal of the field excitation of said variable voltage generator to a degree necessary to insure that said induction generator supplies energy of line frequency to said line circuit independently of the operation of said induction generator at different ones of said speeds.

16. A hydro-electric installation, comprising an alternating current asynchronous generator, a turbine operable under a variable head to drive said generator at different speeds, a distribution circuit of definitely established frequency connected to be supplied by said generator, and means automatically operative in response to the head under which the turbine operates to insure operation of said turbine at different fixed speeds dependent upon the head on said turbine and to maintain the frequency of said generator substantially constant in spite of operation thereof at a widely variable speed.

17. A hydro-electric installation for operation under conditions of widely varying head, comprising an alternating current generator, a turbine mechanically connected to said generator and operable to drive said generator at a plurality of different speeds dependent upon the head on said turbine, a distribution circuit carrying current of definitely established frequency, and means automatically controlled in response to a characteristic of the head on said turbine for determining the speed of operation of said generator and for insuring that said generator produces current of said definite frequency independently of operation of said generator at different ones of said speeds.

18. A hydro-electric installation for operation under conditions of widely varying head comprising an alternating current generator, a turbine mechanically connected to said generator and operable to drive said generator at a plurality of different speeds dependent upon the head on said turbine, a distribution circuit carrying current of definitely established frequency, and instrumentalities automatically controlled in response to a characteristic of the head on said turbine for determining the speed of operation of said generator and for insuring that said generator produces current of said definite frequency independently of its operation at different ones of said speeds and for insuring the connection of said generator to and its disconnection from said line circuit as the head on said turbine passes through a predetermined limiting value.

19. A hydro-electric installation for operation under conditions of variable head, comprising an alternating current asynchronous generator, a turbine mechanically connected to said generator and operable to drive said generator at different speeds dependent upon the head on said turbine, a distribution circuit carrying current of definitely established frequency connected to said generator, a generator constituting a source of variable voltage, a source of variable frequency electrically connected between said source of variable voltage and said asynchronous generator, and means automatically responsive to a characteristic of the head on the said turbine for varying the voltage of said variable voltage source and reversing the phase of the current supplied by said source of variable frequency to said asynchronous generator, and additional means automatically operative in response to a characteristic of the electrical energy of said asynchronous generator for maintaining the voltage and frequency of said asynchronous generator constant.

20. A power installation for operation under conditions of widely varying speed of prime mover, comprising an alternating current generator of the asynchronous type, a prime mover operable to drive said generator at a plurality of fixed speeds, and means automatically operative in response to a condition affecting the operation of said prime mover for maintaining the frequency of the energy supplied by said generator substantially constant in spite of operation of said prime mover at a plurality of fixed speeds.

21. A hydro-electric installation for operation under conditions of widely varying turbine speed, comprising an alternating current generator, a turbine operable to drive said generator at a plurality of speeds below synchronous speed, and means for causing the frequency of the energy supplied by said generator to be maintained substantially constant in spite of operation of said turbine at said plurality of fixed speeds, said means being responsive to a condition attendant upon the supply of hydraulic energy available for conversion by said turbine.

22. A hydro-electric power installation for the generation of alternating current of constant frequency under conditions of widely varying available head on the turbine of the installation and varying speed of said turbine incident thereto, comprising a source of hydraulic power of variable available head, a hydraulic turbine operable from said source of power at a plurality of speeds dependent upon the head available, an alternating current dynamo-electric unit, said dynamo-electric unit including a machine having relatively rotatable members each carrying alternating current, an alternating current distribution circuit the frequency of whose current is established by means other than said dynamo-electric unit, and means for causing operation of said alternating current machine through energy derived from said turbine and at a speed dependent upon the speed of operation of said turbine and for insuring that said machine produces alternating current of the frequency of said distribution circuit independently of the particular speed of operation of said machine.

In testimony whereof, the signature of the inventor is affixed hereto.

RAE W. DAVIS.